United States Patent [19]

Morokuma et al.

[11] 4,116,559
[45] Sep. 26, 1978

[54] PROCESS OF AND APPARATUS FOR FORMING A PICTURE IMAGE INFORMATION SUCH AS A MANUSCRIPT, ETC. ON A DRY TREATED FILM AND DEVELOPING THE SAME

[75] Inventors: Tadashi Morokuma, Tokyo; Ryo Fujimori, Hachioji, both of Japan

[73] Assignee: Olympus Optical Co., Ltd., Tokyo, Japan

[21] Appl. No.: 798,613

[22] Filed: May 19, 1977

[30] Foreign Application Priority Data

May 26, 1976 [JP] Japan .................................. 51/59939
May 26, 1976 [JP] Japan .................................. 51/59940
May 26, 1976 [JP] Japan .................................. 51/59941

[51] Int. Cl.$^2$ .......................... G03B 29/00; G03C 5/24
[52] U.S. Cl. ................................. 355/28; 96/48 HD; 219/216; 250/319; 355/77; 355/100
[58] Field of Search ............... 355/28, 29, 30, 100, 355/73, 45, 40, 42, 77; 219/216; 96/48 HD; 250/316-319

[56] References Cited

U.S. PATENT DOCUMENTS

| | | | |
|---|---|---|---|
| 3,094,036 | 6/1963 | Benson | 355/45 X |
| 3,149,529 | 9/1964 | Critchlow | 355/42 X |
| 3,445,654 | 5/1969 | Loprest | 250/319 |
| 3,588,243 | 6/1971 | Osawa et al. | 355/40 |
| 3,797,932 | 3/1974 | Endter et al. | 355/73 X |
| 4,030,408 | 6/1977 | Miwa | 219/216 X |

Primary Examiner—Richard A. Wintercorn
Attorney, Agent, or Firm—Haseltine, Lake & Waters

[57] ABSTRACT

A process of forming a picture image information such as a manuscript, etc. on a dry treated roll film and developing the same is disclosed. The process comprises successive steps of preparing a film segment having a given length and formed thereon with said picture image information and hot developing said image information formed on said film segment under a flat state without applying tension thereto. An apparatus for practicing the process is also disclosed. The apparatus comprises a cutting block, a photographic block and a hot developing block arranged in succession along a path, said hot developing block having at least one flat surface for attracting a film segment having a given length, and a film carriage provided at its one end with a holding head for attracting and holding said film segment formed thereon with said picture image information and movable along said path to carry said film segment in succession to a position opposed to each of said blocks.

16 Claims, 16 Drawing Figures

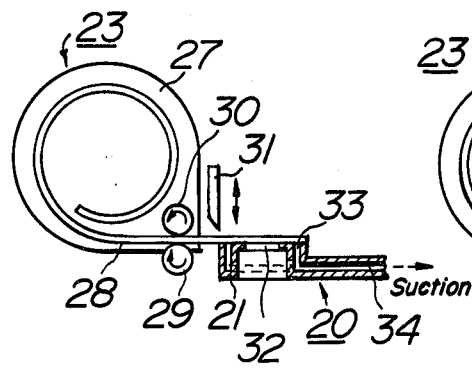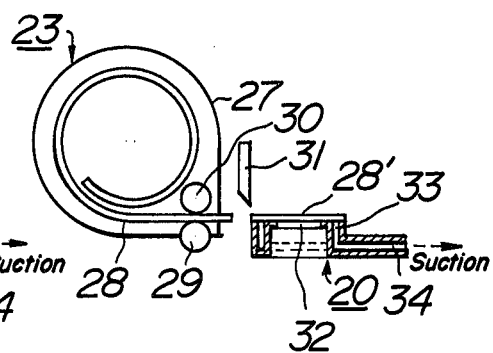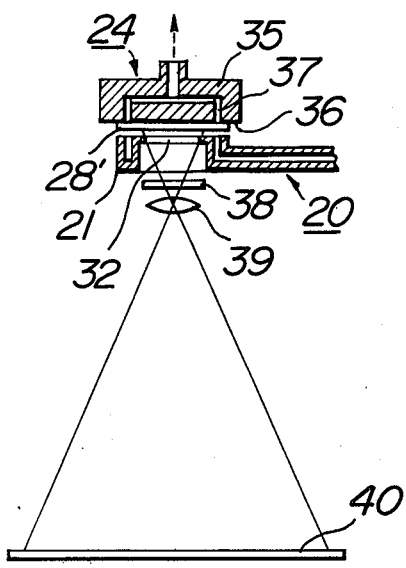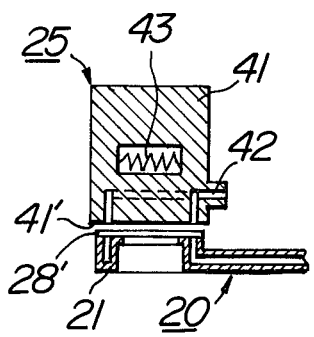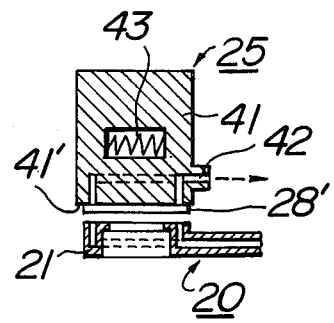

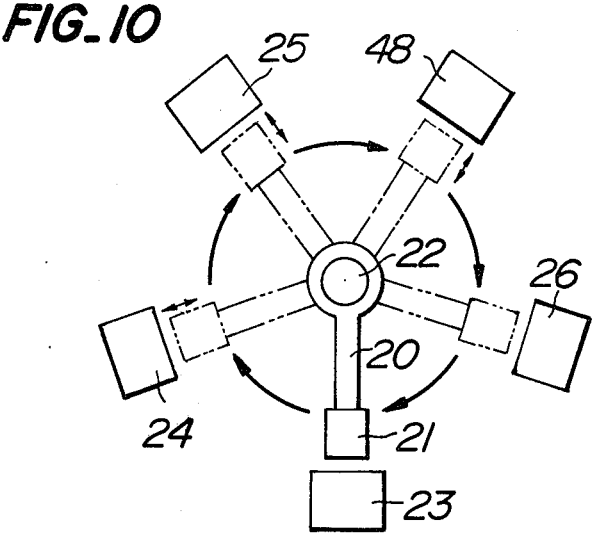
FIG._10
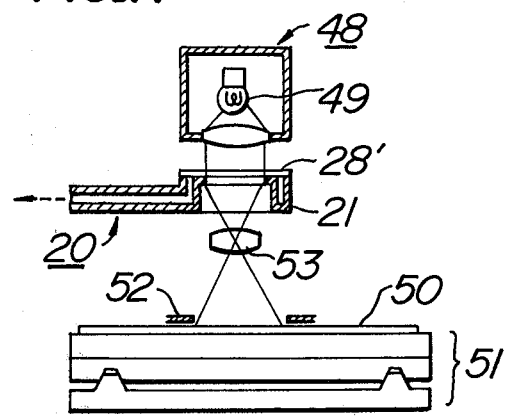
FIG._11
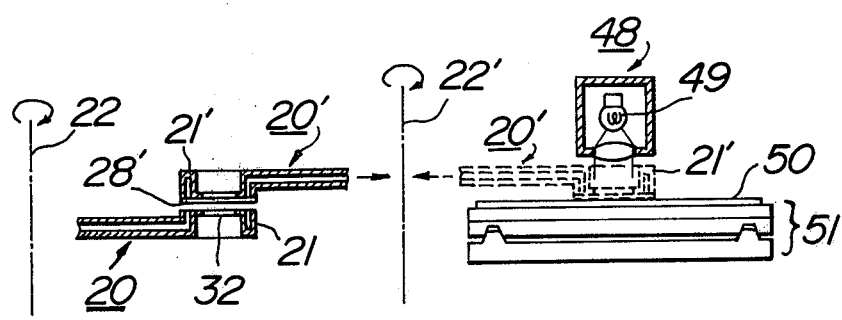
FIG._12

PROCESS OF AND APPARATUS FOR FORMING A PICTURE IMAGE INFORMATION SUCH AS A MANUSCRIPT, ETC. ON A DRY TREATED FILM AND DEVELOPING THE SAME

This invention relates to a process of and apparatus for forming a picture image information such as a manuscript, etc. on a dry treated film and developing the same.

Such dry treated film after having been exposed to light reflected back from the picture image information and formed with it can be hot developed.

As a result, the film has the advantage that treatment with a chemical liquid such as a developing liquid, fixing liquid, etc. is not required.

The dry treated film now available in market is a dry silver film described in U.S. Pat. Nos. 3,152,903 and 3,152,904 and composed of a flexible plastic substrate such as a MYLAR sheet, etc. and a transparent photosensitive layer coated thereon and adapted to be hot developed. Such hot dry development of the dry silver film can be effected by heating it at a temperature of 120° to 130° C. for several seconds to several tens seconds.

Heretofore it has been the common practice to effect such hot dry development of the dry silver film with the aid of a hot roller or a hot plunger. In such conventional hot dry development, the film is subjected to tension and urged against the outer periphery of the hot roller or the hot plunger is urged against the film under tension.

As a result, the conventional hot dry development has a number of disadvantages. In the first place, since a number of frames on which the picture image information is formed are simultaneously developed, the remaining film portion is uselessly discarded, thereby involving loss of the film. Secondly, heat generated in the hot roller or the hot plunger influences on a next succeeding frame of the film, and as a result, a large distance must be present between the successive frames, thereby rendering the efficiency of using the film bad. Third, that length of the film which is enclosed in a roll film cassette must be changed every time the film is enclosed therein, so that it is rather difficult to handle the roll film. Fourth, since the film is extended along the outer periphery of the hot roller or the hot plunger, the film could not uniformly be urged against it, thereby causing uneven development. Finally, the presence of curved surface on the hot roll or the hot plunger results in deformation of the developed film.

In addition, since the developed film is liable to be influenced by light heat, humid, dust, etc., it is not suitable to preserve the developed film as a microfiche for a long time. As a result, it is preferable to transfer the picture image information formed on a first film onto a second film which is not influenced by light, heat, humid, dust, etc. so as to preserve it as the microfish for a long time. In this case, it is preferable to delete the picture image information formed on the first film by heating again.

An object of the invention, therefore, is to provide a process of forming a picture image information such as a manuscript, etc. on a dry treated roll film and developing the same, which can eliminate the above mentioned disadvantages which have been encountered with the prior art techniques.

Another object of the invention is to provide an apparatus for practicing the process according to the invention, which is simple in construction and reliable in operation.

A further object of the invention is to provide a process of transferring the picture image information formed on a dry treated roll film onto a second film which can preserve as a microfish for a long time.

A still further object of the invention is to provide a process of deleting the picture image information formed on the dry treated roll film by heating again it after the picture image information formed on the film has been transferred onto a second film which can preserve as a microfish for a long time.

Another object of the invention is to provide a heating body which is particularly suitable for applying to hot development of a dry treated roll film.

A feature of the invention is the provision of a process of forming a picture image information on a dry treated roll film and developing the same, comprising successive steps of preparing a film segment having a given length and formed thereon with said picture image information and hot developing said picture image information formed on said film segment under a flat state without applying tension thereto.

In a preferred embodiment of the invention the dry treated roll film may be cut beforehand into a film segment having a given length and then the film segment may be subjected to the light exposure and picture formation. Alternatively, a given length of film may be subjected to the light exposure and picture formation and then cut into a film segment having a given length. As a result, it is possible to eliminate loss of the roll film which has been encountered with the prior art techniques.

In addition, in the case of hot developing the film segment, it is not always necessary to effect the hot development with the aid of a conventional heating body having a curved surface and urge the curved surface of the heating body against the film segment. On the contrary, the invention is capable of effecting the hot development by closely adhering the film segment to a flat surface of the heating body and hence provides the advantage that the film segment thus hot developed is not deformed.

Another feature of the invention is the provision of an apparatus for forming a picture image information on a dry treated roll film and developing the same, comprising a cutting block, a photographic block and a hot developing block arranged in succession along a path, said hot developing block having at least one flat surface for attracting a film segment having a given length, and a film carriage provided at its one end with a holding head for attracting and holding said film segment formed thereon with said picture image information and movable along said path to carry said film segment in succession to a position opposed to each of said blocks.

The invention will now be described in greater detail with reference to the accompanying drawings, wherein:

FIG. 4A is a cross sectional view showing one embodiment of a cutting block shown in FIG. 3 prior to its cutting operation;

FIG. 4B is a similar cross sectional view showing the cutting block shown in FIG. 4A after its cutting operation;

FIG. 5 is a cross sectional view showing one embodiment of a photographic block shown in FIG. 3;

FIG. 6A is a cross sectional view showing a developing block shown in FIG. 3 and a film segment held on a film carriage shown in FIG. 3;

FIG. 6B is a similar cross sectional view showing the developing block shown in FIG. 6A with the film segment held thereon;

FIG. 10 is a plan view showing a modified embodiment of the treating blocks shown in FIG. 3 and further comprising a picture transfer block;

FIG. 11 is a cross sectional view showing one embodiment of the picture transfer block shown in FIG. 10; and FIG. 12 is a cross sectional view showing a modified embodiment of the picture transfer block shown in FIG. 11.

Figure 1:
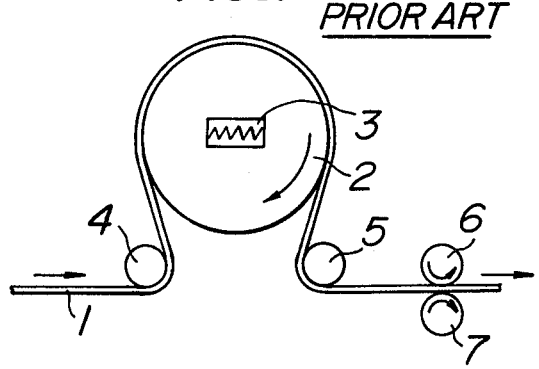
FIGS. 1 and 2 are front views illustrating prior art processes of hot developing a dry treated roll film.

In FIG. 1 is shown a prior art process of hot developing a dry treated roll film. In such conventional hot developing process, a roll film 1 with a series of picture image informations formed thereon is subjected to tension and urged against the outer periphery of a hot roller 2 by means of idler rollers 4 and 5 to hot develop these informations. The film 1 thus developed is then delivered to the outside by means of a feed roller 6 and a pinch roller 7. Reference numeral 3 designates a heat generating body.

The conventional hot developing process shown in FIG. 1 is suitable for simultaneously developing a number of frames of the roll film 1 after a series of picture image informations have been formed thereon, but is difficult to effect the developing treatment unless all of the picture image informations have been formed on such number of frames. Since the roll film 1 is subjected to tension and urged against the outer periphery of the hot rollers 2, that length of the film 1 which is required to be subjected to the hot developing treatment becomes always long. Thus, in the case of forming the picture image information on a small number of frames of the film 1, the remaining film becomes lost. In addition, that length of the film 1 which is enclosed in a roll film cassette (not shown) must be changed every time the film 1 is enclosed therein, so that it is difficult to handle the roll film 1. In addition, since the film 1 is extended along the outer peirphery of the hot roller 2, that surface of the film 1 which makes contact with the hot roller 2 could not uniformly be urged against the hot roller 2. This easily tends to produce uneven development. Moroever, the film 1 is developed with the aid of the hot roller 2, so that there is a risk of the film 1 which has been hot developed being bent.

Figure 2:
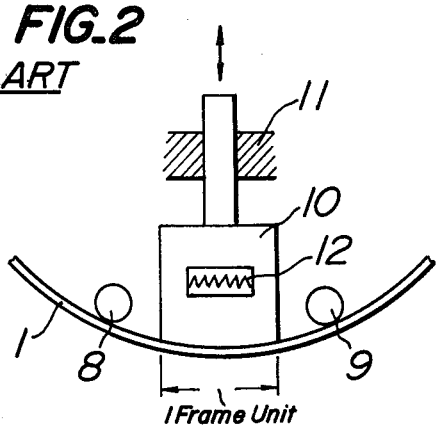

Another hot developing process shown in FIG. 2 has also been well known. In this developing process, a roll film 1 which has been exposed to light reflected back from the image picture information and the information has been formed thereon is subjected to tension by means of idler rollers 8, 9. A hot plunger 10 having a film contact surface which corresponds to one frame of the film 1 is slidably mounted on a stationary guide frame 11 and opposed to the film 1. The hot plunger 10 is urged against a given frame of the film to be hot developed so as to heat and hot develop it. Reference numeral 12 designages a heat generating body of the hot plunger 10.

The conventional hot development process shown in FIG. 2 is suitable for developing one frame unit of the film 1. But, heat generated in the hot plunger 10 influences on a next succeeding frame of the film 1, and as a result, a large distance must be taken between the successive frames, thereby rendering the efficiency of using the film bad. In addition, in the case of hot developing a film having small number of frames with the picture image information formed thereon, the use of the hot development process of the film 1 under a given tension in the same manner as in the case of FIG. 1 provides the disadvantage that a long film having a number of frames inclusive of the frames to be hot developed is required, thereby always involving loss of the film 1. In addition, in the present development process, the hot plunger 10 is urged against the film 1 under a given tension so as to hot develop the film 1 so that the surface of the hot plunger 10 which makes contact with the film 1 is made convex with a proper radius of curvature. As a result, there is a risk of the film being subjected to uneven development similar to the hot development process described with reference to FIG. 1 and there is a risk of the film which has been hot developed being deformed.

In the hot development process described with reference to FIGS. 1 and 2, the hot roller 2 and hot plunger 10 are urged against the photosensitive layer of the roll film 1, so that the photosensitive layer peels off the roll film 1 to damage the image formed thereon. In order to avoid such disadvantage, the hot roller 2 and hot plunger 10 are urged against the substrate of the roll film 1.

Figure 3:
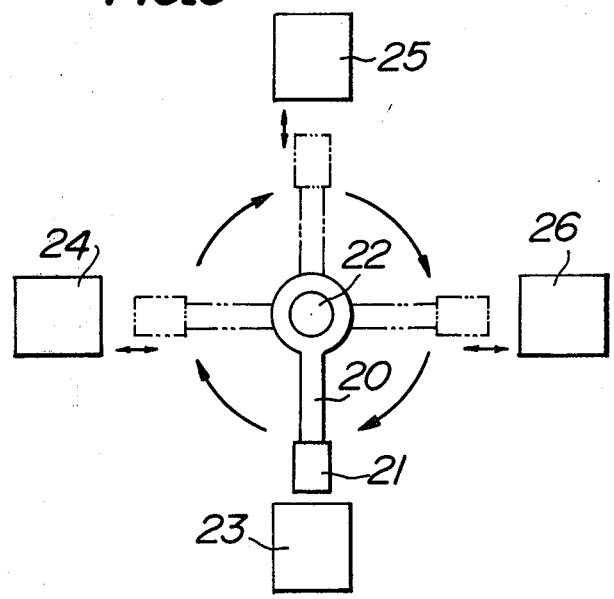
FIG. 3 is a plan view showing treating blocks for practicing a process of forming a picture image information on a dry treated roll film and developing the same according to the invention.

In FIG. 3 is shown one embodiment of successive treating blocks for practicing the process of forming picture image information on a dry treated roll film and developing the same according to the invention. These treating blocks are arranged such that a given length of dry treated roll film is delivered and cut into a film segment, that light reflected black from the picture image information is exposed to the film segment to form the picture image information thereon, and that the film segment is subjected to the hot development. A film carriage 20 is provided at its one end with a holding head 21 for holding the film segment thereon, the other end of the film carriage 20 being secured to a rotary shaft 22. Along a circular path having a center at the rotary shaft 22 of the film carriage 20 are arranged in succession a cutting block 23 for delivering a given length of roll film and cutting it into a film segment having a given length, a photographic block 24 for exposing the film segment to light reflected back from a picture image information such as a manuscript and forming the information thereon, a developing block 25 for hot developing the film segment with the picture image information formed thereon and a delivering block 26 for delivering the film segment thus developed to the outside. The film carriage 20 is constructed such that its holding head 21 passes through these blocks 23, 24, 25 and 26 in succession and then is returned again to the cutting block 23, thereby repeating the treating steps.

In FIGS. 4A and 4B is shown one embodiment of the cutting block 23 shown in FIG. 3. In FIG. 4A is shown a condition prior to cutting of a roll film 28, while in FIG. 4B is shown a condition after the roll film 28 has been cut into a film segment having a given length. As shown in FIG. 4A, a given length of the roll film 28 is delivered from a roll film cassette 27 by means of a feed roller 29 driven by a motor, etc. and an idler roller 30 urged against the feed roller 29. The given length of the roll film 28 corresponds to one frame thereof and is held on the holding head 21 of the film carriage 20 as shown in FIG. 4A. Then, a cutter 31 is operated to cut the roll film 28 into a film segment 28' having the given length as shown in FIG. 4B. The holding head 21 of the film carriage 20 is provided at its center with an opening 32 through which light may be exposed to the film segment so as to form the picture image information thereon. The holding head 21 is provided around the opening 32 with a groove 33 connected to an air passage 34 formed in the film carriage 20. The roll film delivered on the holding head 21 is efficiently held thereon by a reduced air pressure supplied through the air passage 34 to the groove 33. As a result, the film segment 28' cut into one frame of the film is efficiently held on the holding head 21 of the film carriage 20 by means of the reduced air pressure as shown in FIG. 4B. Even when the film carriage 20 is rotated, the position of the film segment 28' is not displaced. The film segment 28' cut and efficiently held on the holding head 21 of the film carriage 20 is then carried to the photographic block 24.

In FIG. 5 is shown one embodiment of the photographic block 24 shown in FIG. 3. The photographic block 24 functions to expose light reflected back from a picture image information such as a manuscript 40 to the film segment 28' which has been cut to one frame by the cutting block 23 so as to form the picture image information on the film segment 28'. That is, the film carriage 20 opposed to the cutting block 23 shown in FIG. 3 is rotated to carry the film segment 28' held on the holding head 21 of the film carriage 20 to the position opposed to a camera anvil 35 of the photographic block 24. The rotation of the film carriage 20 is stopped at this position and the film segment 28' is attracted to an image forming surface 36 of the camera anvil 35. For this purpose, the supply of the reduced air pressure to the film carriage 20 is ceased and the reduced air pressure is applied to an air passage 37 formed in the image forming surface 36 of the camera anvil 35 to attract the film segment 28' held on the holding head 21 of the film carriage 20 toward the image forming surface 36 of the camera anvil 35 and closely adhere the film segment 28' thereto. In addition, directly below the camera anvil 35 and the opening 32 of the holding head 21 are arranged a shutter 38, photographic lens 39 and manuscript 40. The manuscript 40 is illuminated with light emitted from a light source (not shown) and the shutter 38 is opened to expose the film segment 28' held on the image forming surface 36 of the camera anvil 35 to light reflected back from the manuscript 40 and form the picture of the manuscript 40 on the film segment 28'. In this case, the opening 32 provided for the film carriage 20 functions as the aperture for the film segment 28'.

After the exposure and picture formation of the film segment 28' have been completed, the film segment 28' is attracted again to the holding head 21 of the film carriage 20 and held thereon.

In the present embodiment, the film segment 28' held on the holding head 21 has been attracted to the image forming surface 36 of the camera anvil 35 and the picture has been formed on the film segment 28' through the opening 32 provided for the holding head 21. But, if the film segment 28' attracted and held on the holding head 21 can effectively maintain its flatness, it is not always necessary to attract the film segment 28' toward the image forming surface 36 of the camera anvil 35. The picture image information may be formed on the film segment 28' held on the holding head 21. In addition, after the film segment 28' has been held on the image forming surface 36 of the camera anvil 35, the film carriage 20 may be removed therefrom and then the exposure and the picture formation may be effected. In this case, however, the mechanism for rotating the film carriage 20 becomes complex.

Then, the film carriage 20 is rotated again to carry the film segment 28' whose exposure and picture formation have been completed to the position opposed to the developing block 25.

In FIGS. 6A and 6B is shown one embodiment of the developing block 25 which functions to hot develop the film segment 28' whose exposure and picture formation have been completed by the photographic block 24 shown in FIG. 5.

FIG. 6A shows a condition in which the film segment 28' is held on the holding head 21 of the film carriage 20 and opposed to the developing block 25. FIG. 6B shows a condition in which the film segment 28' is held on the developing block 25 and hot development is effected. At this position, the rotation of the film carriage 20 is stopped and the film segment 28' is closely adhered to a flat surface 41' of the heating body 41 of the developing block 25 as shown in FIG. 6B. In order to hold the film segment 28' on the flat surface 41' of the heating body 41, the supply of the reduced air pressure to the film carriage 20 is ceased, and the reduced air pressure is applied to an air passage 42 provided for the heating body 41 and communicated with the flat surface 41' to attract the film segment 28' held on the holding head 21 of the film carriage 20 toward the flat surface 41' of the heating body 41. The heating body 41 encloses therein a heat generating body 43 which functions to heat the heating body 41 to a temperature of 120° to 130°. The temperature is always made constant by means of a temperature control means (not shown). If the film segment 28' is closely adhered to the flat surface 41' for a given time of several seconds to several tens seconds, the film segment 28' is hot developed. After the film segment 28' has been closely adhered to the flat surface 41' of the heating body 41 for the given time and hot developed, the reduced air pressure supplied to the heating body 41 is ceased and the film segment 28' is attracted to the holding head 21 of the film carriage 20. Then, the film carriage 20 is rotated to carry the film segment 28' whose development has been completed to the position opposed to the delivery block 26 shown in FIG. 3.

Figure 7A:
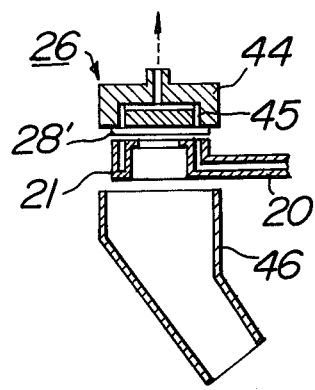
FIG. 7A is a cross sectional view showing a delivering block shown in FIG. 3 with the film segment held thereon.
Figure 7B:
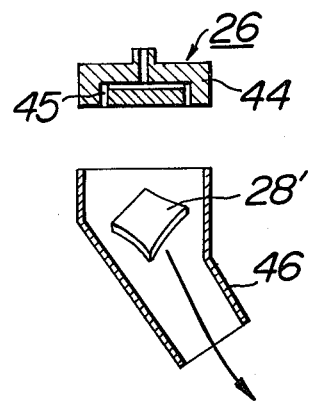
FIG. 7B is a similar cross sectional view showing the delivering block shown in FIG. 7A with the film carriage removed therefrom and a chute with the film segment dropping therethrough.

In FIGS. 7A and 7B is shown in section one embodiment of the delivery block 26 shown in FIG. 3 which functions to deliver the film segment 28' whose hot development has been completed at the developing block 25 shown in FIGS. 6A and 6B. That is, the film carriage 20 is rotated to carry the film segment 28' held on the holding head 21 of the film carriage 20 to that position of the delivery block 26 which is opposed to a stationary member 44 thereof where the rotation of the film carriage 20 is stopped and then the film segment 28' held on the holding head 21 is attracted to the stationary member 44 as shown in FIG. 7A. In order to attract the film segment 28' to the stationary member 44, supply of the reduced air pressure to the film carriage 20 is ceased and the reduced air pressure is applied to an air passage 45 provided for the stationary member 44 to attract the film segment 28' held on the holding head 21 of the film carriage 20 to the stationary member 44 and closely adhere the film segment 28' to the latter. In addition, the delivery block 26 is provided with a chute 46 which is opposed through the holding head 21 of the film carriage 20 to the stationary member 44.

As shown in FIG. 7A, after the film segment 28' has been attracted to the stationary member 44, the film carriage 20 is rotated again to the cutting block 23 shown in FIG. 3. After the holding head 21 has been removed from the delivering block 26 as shown in FIG. 7B, supply of the reduced air pressure to the stationary member 44 is stopped, and the film segment 28' held thereon is dropped by its own weight into the chute 46 and delivered to the outside.

In the present embodiment, the film segment 28' whose hot development has been completed was held on the stationary member 44 and then dropped into the chute 46. Alternatively, the film segment 28' whose hot development has been completed may be attracted to the film carriage 20 and then the supply of the reduced air pressure thereto is ceased. Subsequently, the film carriage 20 may be inclined by means of a motor, solenoid or cam mechanism, etc. so as to drop down the film segment 28' into the chute 46. In addition, use may be made of a belt conveyor, etc. instead of the chute 46 so as to carry the film segment 28' placed thereon to any other position where the film segment 28' may be delivered to the outside.

The film carriage 20 is rorated from the delivery block 26 to the cutting block 23, thereby repeating the above described steps. The film segment 28' removed from the delivery block 26 may be adhered to an aperture card or suitably arranged to prepare a master fish which can be transferred into a fish card.

In the above described process of forming the image information picture on the dry treated roll film and developing the same, at first the dry treated roll film was cut into the film segment having the given length which corresponds to one frame unit and then the film segment was subjected to the exposure and picture formation and subsequently the film segment was developed and finally delivered to the outside. In this way, the roll film is not lost contrary to the conventional process. In addition, in the case of hot developing the film segment, the film segment is formed of one frame unit, so that heat is not influenced on the next succeeding frame. Moreover, provision was made of the flat surface 41' as shown in FIGS. 6A and 6B, and to the flat surface 41' was attracted the film segment 28' which has completed the exposure and picture formation and then the hot development thereof was effected. As a result, there is no risk of the film segment 28' being unevenly developed and being deformed. In addition, the roll film is not required to be subjected to tension contrary to the prior art techniques and the mechanism for practicing the process becomes simple in construction.

The invention is not limited to the above embodiment and various changes, modifications and alternations may be made. For example, in the above described embodiment, successive treating blocks have been arranged along the circular path and the film carriage 20 has been rotated along the circular path to cut the roll film into the film segment and then effect the exposure, picture formation and hot development thereof. Alternatively, these treating blocks may be aligned with a straight line path and the film carriage 20 may be moved along such straight line path so as to effect the successive treatments.

In addition, to the contrary shaft 22 shown in FIG. 3 may be secured a plurality of film carriages whose number is equal to the number of the successive treating blocks and these film carriages may relatively be rotated to respective treating blocks and a plurality of treatments may simultaneously be effected. The use of the measures of providing a plurality of film carriages can improve the efficiently of treating the roll film.

In addition, prior to cutting the roll film into the film segment having the given length, that portion of the roll film which has the given length may be subjected to the exposure and picture formation and then this roll film portion may be cut into the film segment which may then be subjected to the hot development. In this case, both the cutting block and the photographic block may be located at the same position, so that the mechanism for rotating the film carriage 20 shown in FIG. 3 becomes simple in construction. As a result, the apparatus for practicing the process according to the invention becomes small in size and can improve its treating efficiency.

Figure 8:
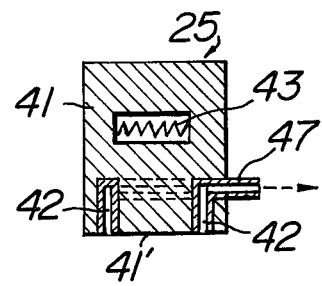
FIG. 8 is a cross sectional view showing a modified embodiment of the developing block shown in FIGS. 6A and 6B.

In the case of applying the reduced air pressure to the air passage 42 of the heating body 41 of the developing block 25 according to the invention, if the temperature of the heating body 41 becomes lowered or changed due to the reduced air pressure, it is preferable to use heat insulating material 47 as shown in FIG. 8 which can resist against heat which is higher than a given temperature and particularly heat insulating material such as asbestos, Teflon, etc. having an ability of insulating heat on the order of 150° C. which is produced when the film segment 28' is hot developed, such heat insulating material 47 is embedded in the heating body 41 so as to surround the air passage 42. In this way, it is possible to prevent the heating body 41 from being lowered and changed in temperature due to the reduced air pressure.

Figure 9A:
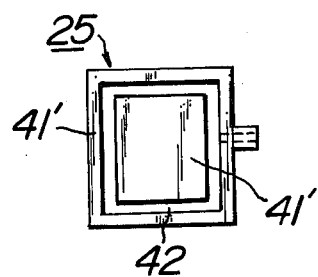
FIG. 9A is a plan view showing the developing block shown in FIG. 8.

In FIG. 9A is shown in a plan view of the air passage 42 provided in the flat surface 41' of the heating body 41. As shown in FIG. 9A, the air passage 42 is extended along the outer edge of the flat surface 41'.

Figure 9B:
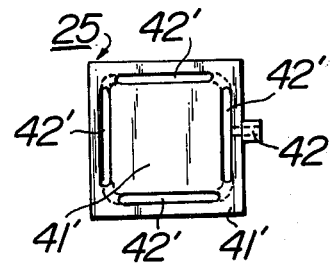
FIG. 9B is a similar plan view showing another modified embodiment of the developing block shown in FIGS. 6A and 6B.

In FIG. 9B is shown a plan view of a modified embodiment of the air passage shown in FIG. 9A in which a plurality of elongate air holes 42' are arranged along the outer edge of the flat surface 42 and these holes 42' are connected with each other in the heating body 41. The air passage is not limited to the embodiments shown in FIGS. 9A and 9B. Many modifications thereof may be made.

The use of the air passage 42 provided in the flat surface 41' of the heating body 41 and subjected to the reduced air pressure provides the advantage that the film segment 28' is closely adhered to the flat surface 41', and as a result, there is no risk of the film being unevenly developed and deformed by uneven heating.

The dry treated film is usually bad in contrast and tends to be easily influenced by light, heat, humidity, etc., so that it is not suitable to form the picture image information thereon and preserve it for a long time. In addition, the film could not be doubly exposed to light, so that an additional picture formation could not be effected, and as a result, the film is not suitable as the microfiche.

In FIG. 10 is shown one embodiment of successive blocks of an apparatus for transferring the picture image information formed on the film segment onto a second film. In the present embodiment, a picture transfer blocks 48 is arranged between the developing block 25 and the delivery block 26 shown in FIG. 3. The picture transfer block 48 functions to transfer the picture image information formed on the film segment 28' onto the second film.

An example of the second film is of three layers construction composed of a transparent substrate, a thin metal film coated on the transparent substrate and formed of a low melting point metal such as bismuth, tellurium, etc. and a transparent protective film coated on the thin metal film. Such second film is not required to be treated by a chemical liquid such as a developing liquid, fixing liquid, etc.

If the film segment 28' superimposed on the second film and an intense light energy emitted from a Xenon flash lamp, etc. is instantaneously is incident thereon, the low melting metal thin film of the second film becomes melted in response to the picture image information formed on the film segment 28' to instantaneously transfer the picture image information formed on the film segment 28' onto the second film. In addition, another image information can additionally be formed on that part of the second film at which the low melting point film is not melted. Moreover, the picture image information is formed on the second film with the aid of the intensive light energy which melts the metal thin film without requiring any chemical liquid such as a developing liquid, fixing liquid, etc. As a result, the second film is excellent in resolving power and contrast and not influenced by light, heat, humid, dust, etc. Thus, the second film is suitable for preserving it for a long time.

In addition, an electrographic film may be used as the second film. In this case, in order to effect the picture transfer from the film segment 28' onto the second film, the second film is uniformly charged with a flow of corona ions and then the picture image information formed on the film segment 28' is projected on the second film or the film segment 28' is superimposed on the second film and then the second film is exposed to light to form an electrostatic latent image thereon and subsequently the second film is developed by toner and fixed in the usual manner, thereby transferring the picture image information formed on the film segment 28' onto the second film. In this case also, it is possible to form an additional picture image information on the second film.

In FIG. 11 is shown one embodiment of the picture transfer block 48 shown in FIG. 10. In the present embodiment, the picture image information formed on the film segment 28' is transferred onto the second film. This film segment 28' is held on the holding head 21 of the film carriage 20. The film carriage 20 is rotated and brought into a position located between a light source 49 provided for the picture transfer block 48 and a sheet-shaped second film 50 and then stopped. The second film 50 is of three layers construction inclusive of the above mentioned thin layer formed of the low melting point metal. The second film 50 is placed on a table 51 movable in X and Y directions. In the present embodiment, the second film 50 is used as a microfiche, so that a mask 52 having an aperture of a desired size is arranged on a picture transfer surface of the second film 47. Between the film segment 28' and the second film 50 is arranged a projection lens 53 located on the optical axis of the light source 49. In the case of transferring the picture image information formed on the film segment 28' onto the second film 47, it is required to use an intense light energy, so that use is made of a Xenon flash lamp or laser, etc. which emits intense light as the light source 49. If the light source 49 instantaneously emits light, the light is projected through the film segment 28', opening 32 formed in the holding head 21 of the film carriage 20, projection lens 53 and mask 52 onto the second film 50 to transfer the picture image information formed on the film segment 28' onto the second film 50. After the picture image information formed on the film segment 28' has been transferred onto the second film 50, the film carriage 20 is further rotated to carry the film segment 28' to the position of the delivery block 26 shown in FIG. 10.

In the present embodiment, the picture transfer block 48 shown in FIG. 11 was constructed such that the film segment 28' and the second film 50 are separately opposed with each other and that the picture image information formed on the film segment 28' was transferred through the projection lens 53 onto the second film 50. Alternatively, the projection lens 53 may be omitted and the picture transfer may directly be effected with the film segment 28' and the second film 50 closely opposed with each other as shown in FIG. 12.

In one embodiment shown in FIG. 12, the film segment 28' is held on a holding head 21' of a second film carriage 20' which is the same in construction as the film carriage 20. The second film carriage 20' is rotated about the rotary shaft 22' to bring the film segment 28' held on the holding head 21' to a position closely opposed to the second film 50 as shown by dotted lines in FIG. 12. Then, light energy is emitted from the light source 49 for a given time to transfer the picture image information formed on the film segment 28' onto the second film 50. In this case, an opening 32' formed in the holding head 21' serves as a mask of the second film 50. In order to closely adhere the film segment 28' to the second film 50, the second film carriage 20' may be displaced in the axial direction of the rotary shaft 22' thereof.

After the picture image information formed on the film segment 28' has been transferred onto the second film 50, the second film carriage 20' is further rotated to the position of the delivery block 26 shown in FIG. 10 or the film segment 28' is attracted to the holding head 21 of the film carriage 20 and then the film carriage 20 is rotated to the position of the delivery block 26 shown in FIG. 10.

The film segment 28' delivered from the delivery block 26 is formed with the picture image information, so that the film segment 28' may be adhered to the aperture card. But, if the film segment 28' is not used as the aperture card, it is preferable to delete the picture image information from the film segment 28'. In this case, provision may be made of a heating block which is similar in construction to the developing block 25 shown in FIGS. 6A and 6B. The heating block is arranged between the picture transfer block 48 and the delivery block 26 shown in FIG. 10. Then, the film segment 28' is brought into the position opposed to the heating block to delete the picture image information formed thereon. Alternatively, the film segment 28' may freely pass through the delivery block 26, cutting block 23 and photographic block 24 into the position opposed to the hot developing block 25 where the picture image information formed on the picture segment 28' may be deleted by heating and then freely passed through the picture transfer block 48 to the position opposed to the delivery block 27 and the picture segment 28' may be discarded.

The invention is capable of transferring the picture image information formed on the picture segment 28' onto the second film 47 without applying tension to the film segment 28', so that there is no risk of the resolution of the film segment 28' being degraded.

As stated hereinbefore, the use of measures of combining the steps of cutting, light exposure and picture formation and development of the film segment 28' with the step of transferring the picture image information formed on the film segment 28' onto the second film 47 provides the advantage that these treating steps can be effected by a mechanism whose parts are at least locally common in construction and hence the mechanism becomes simple in construction and the treating steps can be effected with high efficiency.

What is claimed is:

1. A method of forming a picture image information on a dry treated roll film and developing the same, comprising the steps of: cutting said dry treated roll film into a portion having a given length, exposing said roll film portion to light reflected back from said picture image information and forming said picture image information thereon, hot developing said picture image information formed on said film segment under a flat state without applying tension thereto by attracting said film segment onto a heating block, said successive steps being carried out by attracting and holding said film segment on respective treatment blocks and carrying said film segment along a path.

2. A method as claimed in claim 1 comprising the steps of: transferring said picture image information hot developed on a first film segment onto a sheet-shaped second film and heating and deleting said picture image information hot developed on said first film.

3. The process according to claim 1 and further comprising a step of transferring said picture image information hot developed on said film segment onto a sheet-shaped second film.

4. The process according to claim 3, wherein said film segment whose picture image information has been transferred onto said second film is heated again to delete said picture image information formed on said film segment.

5. Apparatus for forming a picture image information on a dry treated roll film and developing the same, comprising a cutting block, a photographic block and a hot developing block arranged in succession along a path, said hot developing block having at least one flat surface for attracting a film segment having a given length, and a film carriage provided at its one end with a holding head for attracting and holding said film segment formed thereon with said picture image information and movable along said path to carry said film segment in succession to a position opposed to each of said blocks.

6. The apparatus according to claim 5, wherein said path in a circular path and said film carriage has another end secured to a rotary shaft located at a center of said circular path and rotatable along said circular path.

7. The apparatus according to claim 5, wherein said path is a straight line path and said film carriage has another end secured to a driving mechanism movable along said straight line path.

8. A heating body preferably usable for a hot developing block and enclosing a heat generating body therein and having at least one flat surface and an air passage terminated at said flat surface, a reduced air pressure being applied through said air passage to said flat surface so as to attract said film segment to said flat surface and hold thereon.

9. The heating body according to claim 8, wherein said air passage is surrounded by a heat insulating material so as to prevent the temperature of said flat surface from being lowered due to said reduced air pressure.

10. The apparatus according to claim 5, wherein said film carriage is composed of a plurality of film carriages arranged in opposition to said blocks, respectively.

11. The apparatus according to claim 5, wherein said film carriage is provided therein with an air passage through which is applied a reduced air pressure to said holding head so as to attract and hold said picture segment thereon.

12. The apparatus according to claim 5, wherein said holding head is provided therein with an opening having a size which is required for exposing light reflected back from said picture image information to said film segment, said exposure and picture formation of said film segment being effected through said opening.

13. The apparatus according to claim 5 and further comprising a picture transfer block including an intense light energy emitting light source and a projection lens aligned at the optical axis of said light source, said picture image information formed on said film segment held on said film carriage being transferred through said projection lens onto a sheet-shaped second film opposed through said projection lens to said film segment.

14. The apparatus according to claim 13, and further comprising a second film carriage similar in construction to said film carriage, and movable along said rotary shaft, said film segment hot developed being held on said second film carriage and closely adhered to said second film so as to transfer said picture image information formed on said film segment directly onto said second film.

15. The apparatus according to claim 13, wherein said hot developing block functions to heat said film segment whose picture image information has been transferred onto said second film and delete said picture image information formed on said film segment.

16. The apparatus according to claim 13, wherein said second film is formed of a film which can repeatedly be developed and fixed and formed thereon with an additional picture image information.

* * * * *